Figure 1:
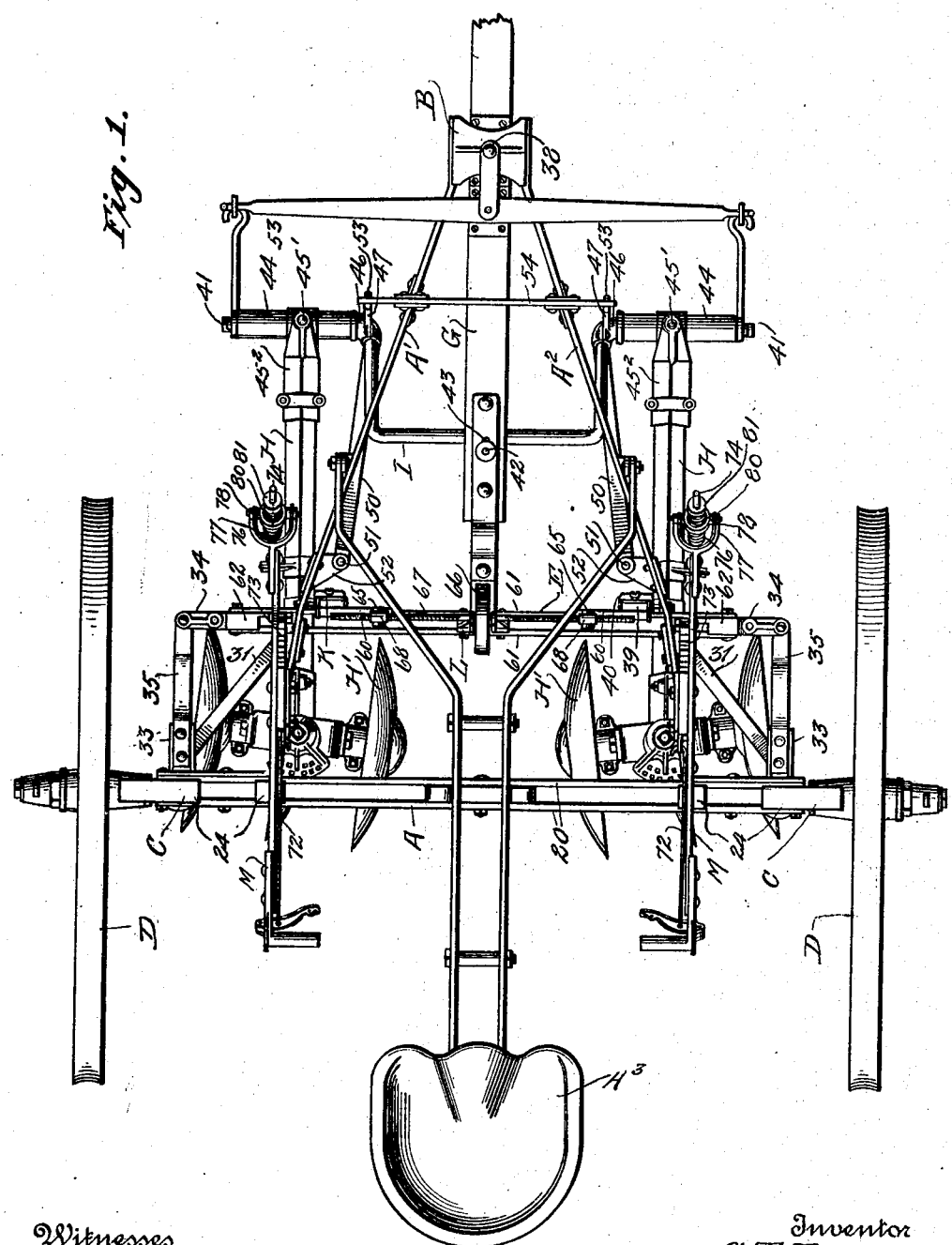

C. T. RAY.
CULTIVATOR.
APPLICATION FILED NOV. 25, 1914.
1,191,114.
Patented July 11, 1916.
4 SHEETS—SHEET 4.
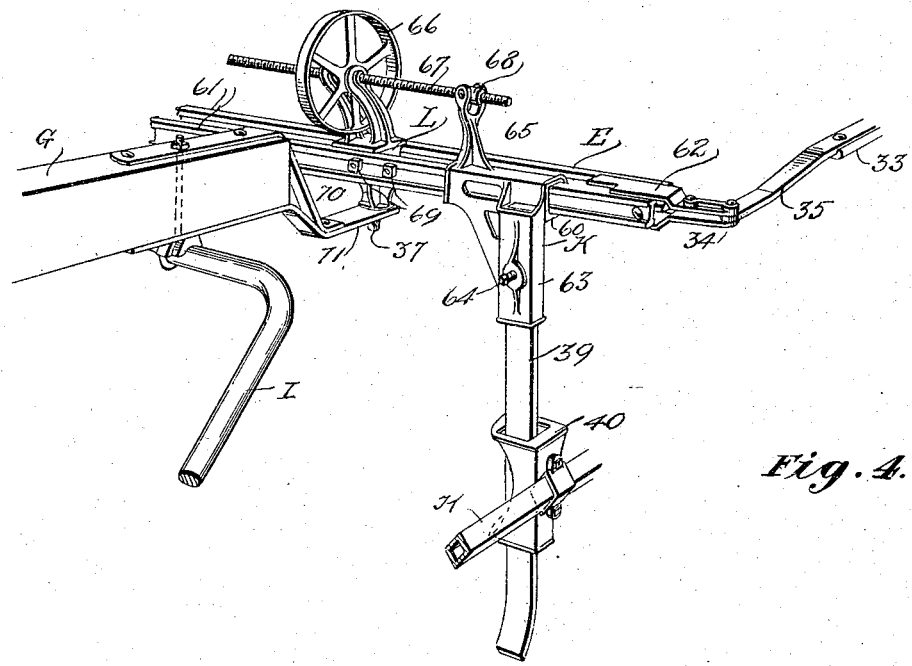
Fig. 4.
Fig. 5.
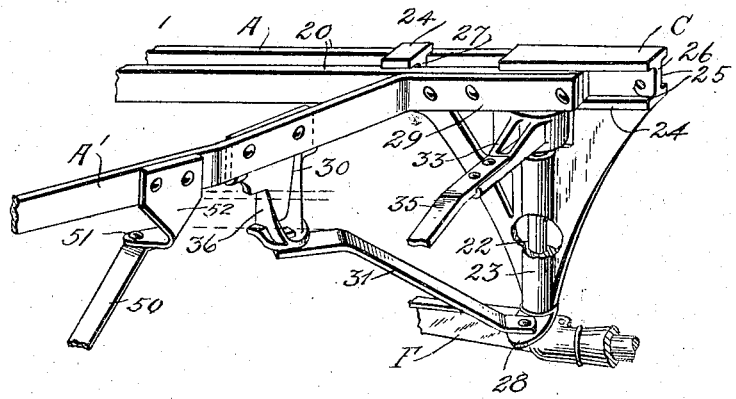
Witnesses
W. C. Fielding
A. Stockman
Inventor
C. T. Ray,
By
C. J. Stockman
Attorneys

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

CULTIVATOR.

1,191,114.  Specification of Letters Patent.  Patented July 11, 1916.

Application filed November 25, 1914.   Serial No. 873,971.

*To all whom it may concern:*

Be it known that I, CHARLES T. RAY, a citizen of the United States, residing at Louisville, in the county of Jefferson and State of Kentucky, have invented new and useful Improvements in Cultivators, of which the following is a specification.

This invention has relation to soil working implements and more particularly to two-row cultivators whose supporting wheels are adapted to be actuated by the operator for adjusting them on vertical axes—as, for example, by pressure applied to foot levers extending laterally from the spindles upon which the supporting wheels are mounted—in the guiding of the implement during its travel.

One of the most important purposes of the invention is to provide an implement of the kind stated having an improved correlation of parts for enabling the earth-working elements to be shifted laterally so as to dodge a stalk of corn set out of line with the rest of the row, or follow a crooked row or avoid digging up the crop in barring off, without changing their angle relatively to the general direction of the row. In accordance with this purpose of the invention I have provided an implement characterized by its inclusion of angularly adjustable supporting wheels connected with a pivoted pole by a means which coördinates the movements thereof, the wheels further having connection with the rear ends of the members which carry the earth working elements and the pole having connection with the forward ends of said members, the correlation of the parts being such that when the wheels are adjusted angularly the pole is turned pivotally and the beams are moved bodily laterally in parallelism with each other.

It will be apparent that the characteristics herein referred to may be more or less successfully embodied in various ways, but as it is an additional purpose of the present invention to provide the most practicable embodiment thereof, I have devised a construction and combination of parts which is believed to carry the leading purpose of the invention into practice in the best manner and this particular construction and combination of parts forms additionally an important part of the present invention.

Moreover, the present invention aims to provide improvements in respect (1) to the connection of the forward ends of the members which carry the earth-working elements with the pivoted pole and (2) to the means for adjusting the rear ends of said members and holding them in adjusted position.

The foregoing purposes, and others which will fully appear to those familiar with this class of implements from the hereinafter description of the preferred embodiment of the invention, are fully secured by the construction illustrated in the accompanying drawings, wherein like characters of reference denote corresponding parts in the several views.

Figure 2:
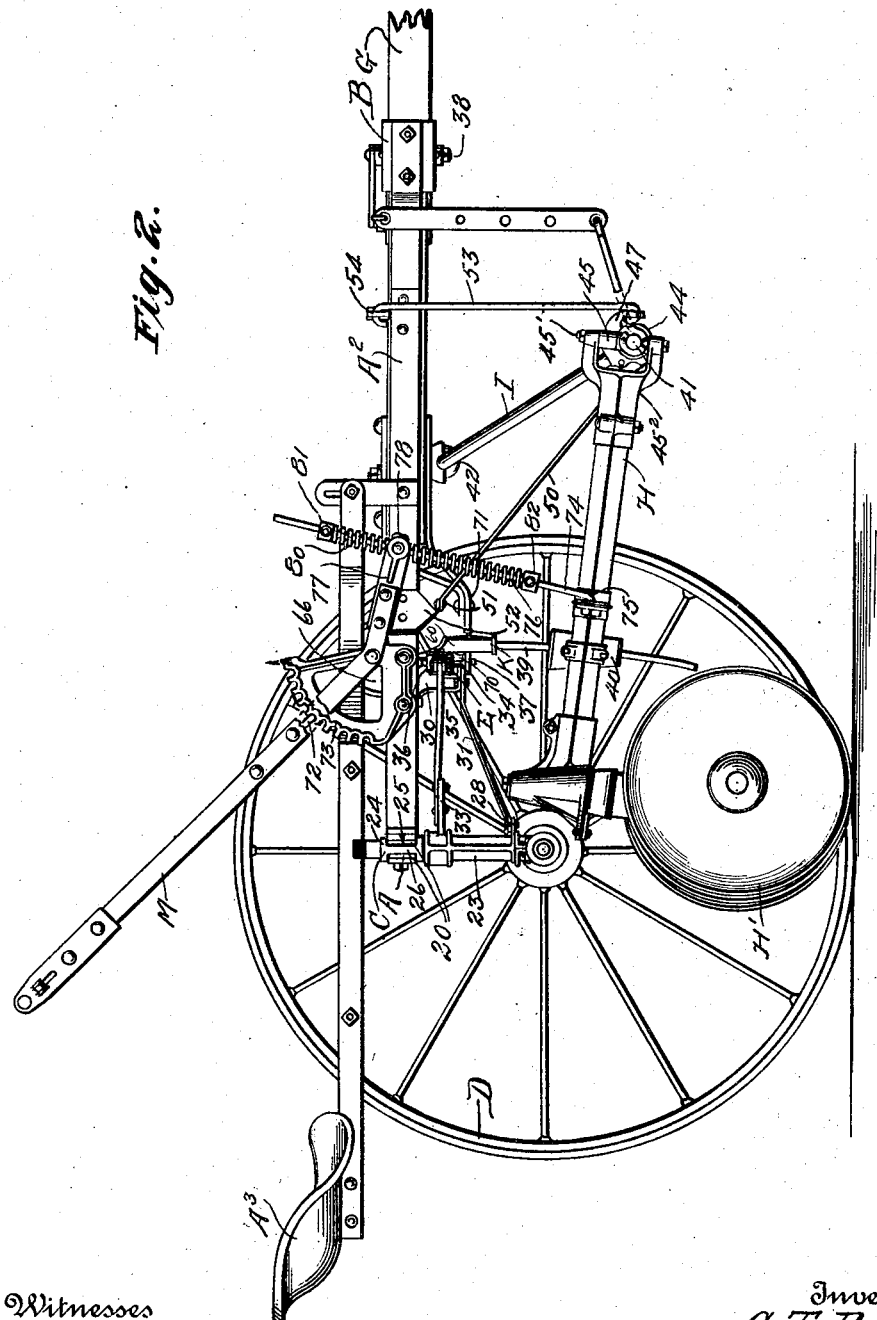
Figure 3:
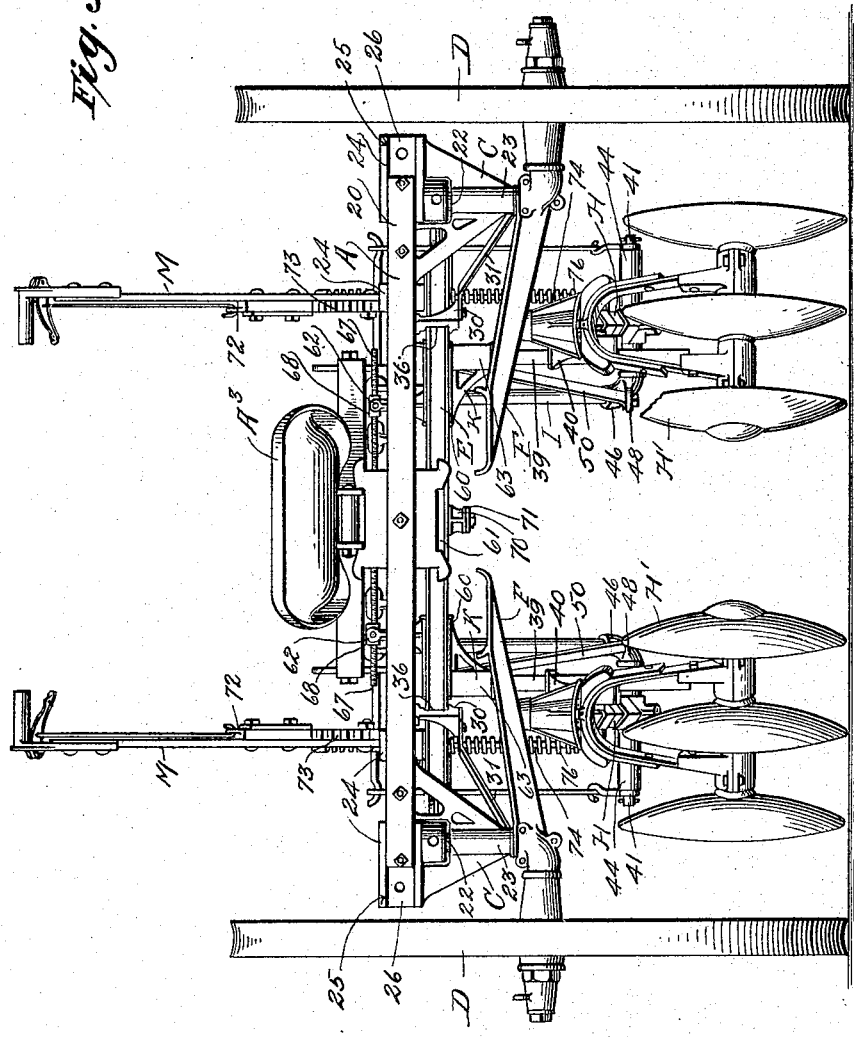

In said drawings: Figure 1 is a plan view of a cultivator embodying the present improvements; Fig. 2 is a side elevation of the same with the nearer wheel removed; Fig. 3 is a rear end elevation of the implement with parts broken away to disclose parts which otherwise would be concealed; Fig. 4 is a detail perspective view particularly intended to show the preferred construction of the transverse slidable member E and its connections; Fig. 5 is a detail perspective view particularly intended to show the construction of the frame at one of the rear corners.

While I shall herein particularly describe the construction illustrated in the accompanying drawings, I would have it understood at the outset that this construction merely exemplifies the at present preferred embodiment of the invention and that changes may be made and the invention otherwise and variously embodied without departing from its spirit or the scope of the subjoined claims.

The frame of the implement preferably comprises a transverse member A and longitudinal members A' and A², the longitudinal members having their rear ends suitably connected to the member A near the opposite ends of the latter and extending thence convergently to a housing B. The transverse member A preferably includes two parallel spaced flat strips 20, 20.

A³ designates the seat for supporting the driver of the implement. This seat is suitably connected with the frame of the implement. It is preferably held against lateral pivotal movement as it does not form an element of the means for changing the direction of travel of the implement. For holding it against lateral pivotal movement I preferably employ a block or casting A⁴ having a recess a⁴ to receive the seat arms a³. The block or casting A⁴ also serves to stiffen the center of the member, being arranged between and secured to the strips 20, as shown.

C, C designate brackets which are arranged at opposite ends of the transverse member A and are suitably connected to the latter and depend therefrom. These brackets provide bearings in which the vertical portions of the axles 22 are pivotally mounted and also serve to stiffen the ends of the transverse member A. The axles 22, hereinafter termed "axle spindles", have outwardly extending ends upon which the supporting wheels D are rotatably mounted. It will be noted that the supporting wheels are adjusted angularly upon vertical axes when the axle spindles are turned in their bearings.

The preferred construction of one of the brackets C is shown in detail in Fig. 5, upon reference to which figure it will be noted that the bracket comprises a sleeve 23 through which the spindle 22 extends, a laterally expanded upper end 24 having channels 25 in its opposite sides and stiffening flanges or webs 26 and 27 arranged at opposite sides of the sleeve 23 and extending to the upper end 24. The channels 25 respectively receive the ends of the strips 20, the latter being closely fitted therein. The bracket preferably has its upper end 24 provided with a cut-away section which also extends through the flange 27, to lighten it. Its lower end is suitably provided with an ear 28. The other bracket is of like construction and need not be particularly set forth.

Each member A', A² of the frame has an outwardly extending rear end 29 which lies upon the adjacent strip 20, and near its rear end each member has a depending bracket 30 which is connected by a stiffening rod 31 with the ear 28 on the adjacent bracket C. See Fig. 5.

E designates a transverse member which is slidably mounted and preferably is arranged in advance of and below the horizontal plane of the frame member A. This member E has its opposite ends suitably connected to the axle spindles 22, so as to transmit axial movement from one spindle to the other. The means for connecting the ends of the member E with the axle spindles, respectively, preferably comprise projections 33 from the axle spindles, projections 34 from the ends of the transverse members and arms 35 fixed to the projections 33 and pivoted to the projections 34. See Fig. 4.

The member E should be guided in its movements transversely of the implement and for so guiding it the brackets 30 preferably are utilized, the said brackets having their forward faces formed with channels 36 which receive the transverse member, see Fig. 5, in which one of the brackets 30 is shown in detail and the transverse member is indicated in dotted outline.

Each axle spindle 22 is provided with suitable means, such as a foot lever F, so arranged that it may be actuated conveniently by the operator, who is seated on the seat A³. It will be noted that when either foot lever is pressed forward the axle spindle 22 connected thereto will be turned and the transverse slidable member E will correspondingly turn the other axle spindle. The transverse member is pivoted to the rear end of a pole G, at 37. This pole extends loosely through the housing B and is pivoted to the latter, so as to turn upon a vertical axis therein, at 38. Accordingly, it will be noted that when the transverse slidable element E receives motion from either axle spindle 22 it not only transmits axial movement to the other axle spindle 22 but further moves the rear ends of the pole G pivotally. The member E thus coördinates the movements of the axle spindles and pivot pole.

H, H designate members which extend longitudinally of the implement and carry the gangs of soil working elements H', H'. These members—which are hereinafter called "beams"—may be of any suitable construction. The soil working elements also may be of any suitable kind, disks being preferred. The soil working elements may be connected to the beams in any suitable way, but I prefer to arrange them in gangs and to connect each gang to its beam in a manner which permits independent adjustment of the angular relation of the gangs to each other and allows the gangs to be held in their selected positions of adjustment. As gangs thus mounted are common in the art it is not believed to be necessary particularly to describe or illustrate the same herein.

The transverse member E is provided near its end with depending arms 39 and these arms extend through boxes 40 which are suitably secured to the beams H at a place considerably rearward of the forward ends of the latter. Hence, slidable movement of the member F transversely of the implement will correspondingly move the rear ends of the beams H, H.

Means are provided for connecting the forward ends of the beams H, H with the pole G whereby the forward ends of the beams are moved laterally simultaneously with the rear ends thereof when the pole and transverse slidable member are moved. The latter means preferably comprises an arch I which is suspended from the pole and has outwardly extending ends 41 suitably connected to the forward ends of the beams H. This arch I is preferably connected to the pole G by means of an eye-bolt 42 whose shank extends loosely through an aperture 43 in the pole. The means for connecting the outwardly extending ends of the arch I with the forward ends of the beams preferably comprise sleeves 44 having hollow projections 45 secured by bolts 45' for pivotal movement in yokes 45² fixed on the forward ends of the beams H. On the angles of the arch I adjacent the sleeve 44 are elbow clamps 46, each of which has a forwardly projecting arm 47 having an eye at the end thereof. Each of the clamps 46, furthermore, has a rearwardly projecting lug 48.

It will be noted that when the pole is swung to the right or left it carries the arch I bodily with it thereby correspondingly moving the forward ends of the beams H, H. In order that the arch may be effectively supported and at the same time be freely movable transversely of the implement, it is preferred to provide links 50, 50 which extend rearward and upward from the arch and have their upper rear ends pivoted at 51 to brackets 52 which are suitably secured to the side members A' and A² of the frame, and also to provide rods 53, 53 which extend upward from the arch and have their upper ends pivoted to the ends of a transverse bar 54 which is suitably secured to the members A' A² near the forward ends of the latter. The forward ends of the links 50 and the lower ends of the rods 53 are preferably connected to the arch I adjacent to the outwardly bent lower ends 41 of the latter, the links 50 being connected to the lugs 48 while the rods 53 are connected to the arms 47. It will now be seen that when the implement is guided to dodge a stalk set out of line with the rest of the row, or to follow a crooked row, or to avoid digging up the crop in barring off, the beams H are simultaneously moved bodily transversely of the implement automatically by their described connection with the guiding mechanism.

In practice, means should be provided whereby the beams may be initially set in any one of a different number of selected angles. For the purpose set forth, the arms 39 which connect the ends of the transverse slidable member E with the beams H are adjustable longitudinally of said member, being preferably carried by brackets K (see Fig. 4,) each of which has a channeled upper end portion 60 which embraces the adjacent side of the member E, the latter preferably comprising two longitudinal spaced bars 61, 61 having appropriate stiffening elements 62 at their ends. The spacing of the said bars 61 from each other provides a longitudinal opening in the member E which allows for the adjustment and guiding of the brackets K. Each bracket K also has a depending sleeve 63 in which the upper end of the arm 39 is secured (preferably adjustably) by suitable means, as the set screw 64, and each bracket further has an upwardly extending portion 65. A second bracket, L, mounted between the brackets K and within the space between the bars 61 of the member E carries a wheel 66 having a shaft 67 with right and left threaded ends, the said ends of the shaft being threaded through trunnions 68 which are pivoted in the portion 65 of the brackets K. The bracket L is secured to the member E as shown at 69. Hence, when the hand wheel 66 is turned the brackets K are caused to slide so as to approach or recede from each other, the depending arms 39 bearing against the boxes 40 and correspondingly adjusting the rear ends of the beams H toward or away from each other, said beams turning pivotally on the vertical axes 45' at their front ends. This adjusts the gangs toward and away from each other. The bracket L preferably has a depending portion 70 which carries a projection forming the element 37 hereinbefore referred to upon which the rear end of the pole G is pivoted, the said pole preferably having a rearwardly extending strap 71 to engage said element 37, as shown in Fig. 4.

The beams H, as usual, are preferably provided with means for adjusting them pivotally on horizontal axes and holding them at various selected heights. The means for this purpose may desirably comprise hand levers M having latches 72, the said latches coöperating with segments 73 suitably secured to the frame of the implement. The forward ends of the hand levers M are connected with the beams H, respectively, near the front ends of the latter, by rods 74 whose lower ends are pivoted to the beams H at 75, the said rods having sliding connection intermediate of their ends with the forward ends of the levers M and being provided with springs 76 which operate to hold the gangs yieldably to their work.

In practice, it is preferred that the forward ends of the levers M be provided with yokes 77 carrying trunnions 78 projecting from collars 79 through which the rods 74 extend loosely, the portions of the rods above the collars also extending through springs 80 which are arranged between said collars and adjustable abutments 81 secured to the lower ends of the rods 74. The springs 76, have their upper ends bearing against the undersides of the collars 79 and their lower ends engage adjustable abutments 82 secured to the lower ends of the rods 74. It will be understood that the springs 76 hold the gangs yieldably to their work while the springs 80 coöperate with the rods 74 in forming a spring suspension for the beams H which relieve the gangs from shock due to the passage of the wheels of the implement over rough ground when the gangs are raised, and also transmit movement from the levers F to the rods 78 in lifting the gangs. It will be noted that in the pivotal adjustment of the beams H to different heights the sleeves 44 turn with the forward ends of the beams, upon the outwardly extending portions 41 of the arch I.

Having now described the invention what I believe to be new and desire to secure by Letters Patent is:—

1. In a soil-working implement, the combination of a frame, angularly adjustable supporting wheels, beams carrying earth working elements, a pole mounted to turn on a vertical axis, connections between the pole and the forward portions of the beams and connections between the wheels and pole and rear portions of the beams, the connections being so arranged that the pole is turned pivotally and the beams are moved bodily laterally when the supporting wheels are adjusted angularly.

2. In a soil-working implement, the combination of a frame, supporting wheels, means adapted to be actuated by the operator for adjusting the wheels on vertical axes, a pivoted pole, beams, soil-working elements carried by the beams, means for coordinating the pivotal adjustments of the pole and supporting wheels, connections between said means and the beams and connections between the pole and the beams, the said connections coöperating to cause the beams to be adjusted bodily laterally when the supporting wheels and pole are adjusted pivotally.

3. In a soil-working implement, the combination of a frame, axle spindles pivotally adjustable on vertical axes, supporting wheels upon the axle spindles, means connected to the axle spindles and operable to adjust the same, beams, soil working elements carried by the beams, means for suspending the forward ends of the beams, the said means having connection with the pole and being arranged to move the forward ends of the beams laterally when the pole is turned pivotally, means having connection with the axle spindles and movable transversely of the implement and connected to the pivot pole, and connections between the latter means and the beams for moving the rear portions of the beams laterally.

4. In a soil working implement, the combination of a frame, axle spindles pivotally adjustable on vertical axes, supporting wheels upon the axle spindles, means connected to the axle spindles and operable to adjust the same, a member movable transversely of the implement, connections between the ends of said members and the spindles, a pole having its rear end pivotally connected with said member, the pole being also pivoted in advance of said member, beams, soil working elements carried by the beams, and means connecting the beams with the pole, the said means being arranged to cause the forward portions of the beams to move transversely of the implement when the pole is turned pivotally.

5. In a soil working implement, the combination of a frame, axle spindles pivotally adjustable on vertical axes, supporting wheels upon the axle spindles, means connected to the axle spindles and operable to adjust the same, a member movable transversely of the implement, connections between the ends of said members and the spindles, a pole having its rear end pivotally connected with said member, the pole being also pivoted in advance of said member, beams, soil working elements carried by the beams, an arch having outwardly extending ends connected to the front ends of the beam, said arch having pivotal connection with the pole at a place between the forward pivot of the latter and the transversely movable member, and said pivotal connection being arranged to cause the arch to move transversely of the implement when the pole is turned on its forward pivot.

6. In a soil working implement, the combination of a frame, axle spindles pivotally adjustable on vertical axes, supporting wheels upon the axle spindles, means connected to the axle spindles and operable to adjust the same, a member movable transversely of the implement, connections between the ends of said members and the spindles, a pole having its rear end pivotally connected with said member, the pole being also pivoted in advance of said member, beams, soil working elements carried by the beams, elements carried by the transversely movable member and beams respectively, the said elements having slidable connection with each other and being arranged to transmit movement transversely of the implement from said member to the rear portions of the beams, and means connecting the forward portions of the beams with the pole for moving the former transversely of the implement when the pole is turned pivotally.

7. In a soil working implement, the combination of a frame, axle spindles pivotally adjustable on vertical axes, supporting wheels upon the axle spindles, means connected to the axle spindles and operable to adjust the same, a pivoted pole, beams, soil working elements carried by the beams, supporting means for the forward ends of the beams, said supporting means having connection with the pole and being arranged to move the forward ends of the beams laterally when the pole is moved pivotally, the forward ends of the beams being pivoted to move on vertical axes relatively to the supporting means, a member mounted to move transversely of the implement, connections between said member and the axle spindle, a pivotal connection between said member and the pole, connections between said member and the rear portions of the beams, including elements carried by the member and beams respectively and slidably engaged with each other, the elements carried by the member being adjustable longitudinally of the latter and operable means connected to the last named elements and arranged to adjust them and to fix them in adjusted position.

8. In a soil working implement, the combination of a frame, axle spindles pivotally adjustable on vertical axes, supporting wheels upon the axle spindles, means connected to the axle spindles and operable to adjust the same, beams which extend longitudinally of the implement and have their forward ends mounted to turn on vertical axes, a member movable transversely of the implement, connections between the ends of said members and the axle spindles and guiding means for said member.

9. In a soil working implement, the combination of a frame, having brackets provided with openings and also having vertical sleeves provided with lateral ears, axle spindles having portions pivotally mounted in the said sleeves and outwardly extending ends, supporting wheels upon the outwardly extending ends of the axle spindles, means connected to the axle spindles and operable to adjust the same, beams which extend longitudinally of the implement and have their forward ends mounted to turn on vertical axes, a member movable transversely of the implement and extending through the openings in the brackets and being guided by the wheels of the latter, connections between the ends of said members and the axle spindles, and braces connecting the brackets with the ears on the sleeves.

10. In a soil working implement, the combination of a frame, axle spindles pivotally adjustable on vertical axes, supporting wheels mounted on the axle spindles, means connected to the axle spindles and operable to adjust the same, beams which extend longitudinally of the implement and have their forward ends pivoted to turn on vertical axes, a member mounted to move transversely of the implement, connections between the member and the axle spindles and connections between said member and the beams, the last named connections including elements adjustable longitudinally of the member and operable means for adjusting said elements.

11. In a soil working implement, the combination of a frame, axle spindles pivotally adjustable on vertical axes, supporting wheels mounted on the axle spindles, means connected to the axle spindles and operable to adjust the same, beams which extend longitudinally of the implement and have their forward ends pivoted to turn on vertical axes, a member mounted to move transversely of the implement, connections between the member and the axle spindles and connections between said member and the beams, the last named connections including elements adjustable longitudinally of the member and means for holding the same in adjusted position.

12. In a soil working implement, the combination of beams which extend longitudinally of the implement and have their front ends pivoted to turn on vertical axes, of means connected with said beams for adjusting them to and holding them in various selected positions, said means comprising slidably mounted brackets, connections between said brackets and the beams, and adjusting and holding means for the brackets.

13. In a soil working implement, the combination of beams which extend longitudinally of the implement and have their front ends pivoted to turn on vertical axes, of means connected with said beams for adjusting them to and holding them in various selected positions, said means comprising slidably mounted brackets, connections between said brackets and the beams, and means having connection with the brackets and operable to adjust the same simultaneously.

14. In a soil working implement, the combination of beams which extend longitudinally of the implement and have their front ends pivoted to turn on vertical axes, of means connected with said beams for adjusting them to and holding them in various selected positions, said means comprising slidably mounted brackets, connections between said brackets and the beams, trunnions connected to the brackets, a right and left-threaded shaft engaging the trunnions, and an operable actuating element for said shaft.

15. In a soil working implement, the combination of beams which extend longitudinally of the implement and have their front ends pivoted to turn on vertical axes, slidably mounted brackets, means for adjusting the brackets transversely of the implement and holding them in various selected positions of adjustment, and elements respectively carried by the brackets and beams, said elements being slidably engaged with each other and arranged to transmit movement from the brackets to the beams.

16. In a soil working implement, the combination of beams which extend longitudinally of the implement and have their front end pivoted to turn on vertical axes, slidably mounted brackets, means for adjusting the brackets transversely of the implement and holding them in various selected positions of adjustment, arms carried by the brackets and depending therefrom, and sleeves carried by the beams and loosely receiving said arms.

17. In a soil working implement, the combination of beams which extend longitudinally of the implement and whose front ends are pivoted to turn on vertical axes, slidably mounted brackets, means for adjusting the brackets transversely of the implement and holding them in various selected positions of adjustment, said brackets having sleeves, arms extending into said sleeves and adjustably secured thereto and depending therefrom and sleeves secured to the beams and through which the arms extend, the arms slidably engaging the latter sleeves.

18. In a soil working implement, the combination of a frame, a pivoted pole, an arch pivotally supported on said pole and having laterally extending ends, beams whose forward ends are pivotally connected to the laterally extending ends of the arch, the arch being movable transversely of the implement when the pole is turned pivotally, and a pivoted supporting means connecting the arch to the frame.

19. In a soil working implement, the combination of a frame, a pivoted pole, an arch pivotally supported on said pole and having laterally extending ends, beams whose forward ends are pivotally connected to the laterally extending ends of the arch, the arch being movable transversely of the implement when the pole is turned pivotally, and a pivoted supporting means connecting the arch to the frame, the last mentioned supporting means comprising links whose forward ends have connection with the arch and whose rear ends have connection with the frame, a transverse member fixedly connected to the frame and depending rods whose upper ends are pivoted to the ends of the transverse member and whose lower ends have pivotal connection with the arch.

In testimony whereof I have hereunto set my hand in presence of two subscribing witnesses.

CHARLES T. RAY.

Witnesses:
 WM. M. JOHNSTON,
 J. FRED HARTKEMEIER, Jr.

Copies of this patent may be obtained for five cents each, by addressing the "Commissioner of Patents, Washington, D. C."